United States Patent
Farrokhi

(10) Patent No.: US 8,509,345 B2
(45) Date of Patent: Aug. 13, 2013

(54) CREST FACTOR REDUCTION WITH PHASE OPTIMIZATION

(75) Inventor: Farrokh Farrokhi, San Ramon, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 1082 days.

(21) Appl. No.: 12/455,952

(22) Filed: Jun. 9, 2009

(65) Prior Publication Data

US 2009/0310710 A1 Dec. 17, 2009

Related U.S. Application Data

(60) Provisional application No. 61/131,760, filed on Jun. 11, 2008.

(51) Int. Cl.
*H04K 1/02* (2006.01)

(52) U.S. Cl.
USPC ............ 375/296; 340/426.2; 455/114.3; 398/193

(58) Field of Classification Search
None
See application file for complete search history.

(56) References Cited

U.S. PATENT DOCUMENTS

| | | | |
|---|---|---|---|
| 6,125,103 A | 9/2000 | Bauml et al. | |
| 7,061,991 B2 | 6/2006 | Wright et al. | |
| 7,190,292 B2 | 3/2007 | Bizjak | |
| 7,593,449 B2* | 9/2009 | Shattil | 375/130 |
| 7,634,024 B2 | 12/2009 | Tan | |
| 8,050,352 B2* | 11/2011 | Schell et al. | 375/296 |
| 2003/0147655 A1* | 8/2003 | Shattil | 398/182 |
| 2003/0161411 A1 | 8/2003 | McCorcle et al. | |
| 2004/0186867 A1 | 9/2004 | Schenk | |
| 2006/0014500 A1 | 1/2006 | Marsili | |
| 2006/0098749 A1 | 5/2006 | Sung et al. | |
| 2006/0165158 A1 | 7/2006 | Richardson | |
| 2008/0049864 A1 | 2/2008 | Eriksson et al. | |
| 2009/0029664 A1 | 1/2009 | Batruni | |
| 2009/0310710 A1 | 12/2009 | Farrokhi | |

FOREIGN PATENT DOCUMENTS

| | | |
|---|---|---|
| WO | 2009017527 | 5/2009 |
| WO | 2009151579 | 12/2009 |

OTHER PUBLICATIONS

U.S. Appl. No. 11/881,821 Office Action Mailed Jul. 29, 2010.
U.S. Appl. No. 11/881,821, filed Jan. 27, 2011, Roy G. Batruni.
Written Opinion of the International Searching Authority for related International Application No. PCT/US09/03470, ISA/US, Alexandria, Virginia, mailed on Aug. 10, 2009; 4 pages.
International Search Report for related International Application No. PCT/US09/03470, ISA/US, Alexandria, Virginia, mailed on Aug. 10, 2009; 2 pages.
International Preliminary Report on Patentability for related International Application No. PCT/US09/03470, The International Bureau of WIPO, Geneva, Switzerland, issued Dec. 13, 2010; 5 pages.

* cited by examiner

*Primary Examiner* — Adolf Dsouza

(74) *Attorney, Agent, or Firm* — Sterne, Kessler, Goldstein & Fox PLLC

(57) ABSTRACT

A system for reducing peaks comprises a processor and a memory. The processor is configured to determine phase offsets for a plurality of input signals. The phase offsets are determined using trials of phase offsets to determine a selected set of phase offsets. The processor is further configured to modulate the input data signals using the selected set of phase offsets to produce modulated phase offset data signals and to generate a sum of modulated phase offset data signals, such that the sum has a lower peak value as compared to the sum not using the selected set of phase offset signals.

20 Claims, 9 Drawing Sheets

CREST FACTOR REDUCTION WITH PHASE OPTIMIZATION

CROSS REFERENCE TO OTHER APPLICATIONS

This application claims priority to U.S. Provisional Patent Application No. 61/131,760 entitled CFR REDUCTION WITH PHASE OPTIMIZATION filed Jun. 11, 2008 which is incorporated herein by reference for all purposes.

BACKGROUND OF THE INVENTION

A cellular telephone base station communicates with a plurality of cellular telephone customers using radio frequency signals encoded using one of many encoding schemes. Some radio frequency encoding schemes (e.g., multicarrier GSM) divide the plurality of customers into multiple groups and transmit to each group using a different carrier frequency. Some radio frequency encoding schemes (e.g., OFDM) transmit to each customer using multiple carrier frequencies in parallel. The digital signals modulated at different frequencies are summed, converted to analog signals, and sent to a power amplifier and transmitter. When the signals on the multiple different carrier frequencies are identical (e.g., during signal headers, mid-ambles, or post-ambles) the signals can add constructively when summed, leading to peaks that are considerably higher than the peaks that normally occur during signal transmission.

BRIEF DESCRIPTION OF THE DRAWINGS

Various embodiments of the invention are disclosed in the following detailed description and the accompanying drawings.

DETAILED DESCRIPTION

Figure 1A:
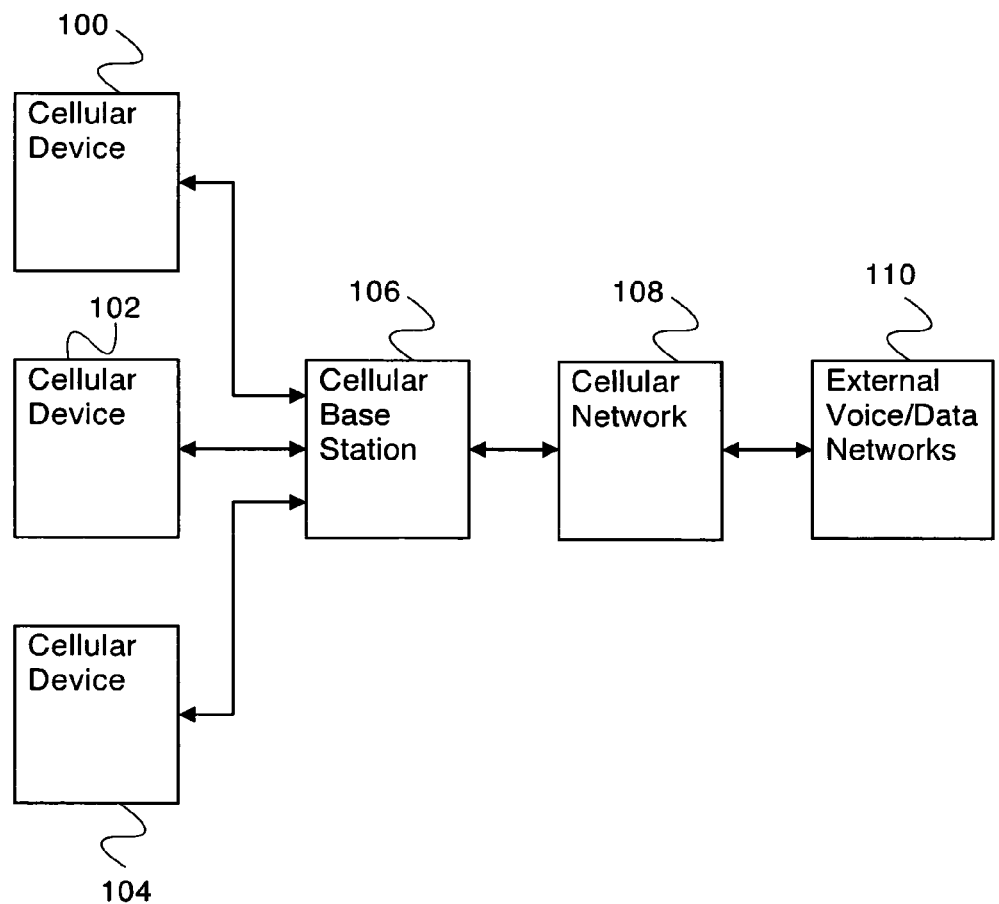
FIG. 1A is a block diagram illustrating an embodiment of a wireless network using crest factor reduction with phase optimization.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Crest factor reduction with phase optimization is disclosed. A system for reducing peaks comprises a processor and a memory. The processor is configured to determine a phase offset for each of a plurality of input signals, wherein the phase offset for each of the plurality of input signals are determined using one or more trials of phase offsets to determine a selected set of phase offsets. The processor is further configured to modulate the plurality of input data signals using the selected set of phase offsets to produce a plurality of modulated phase offset data signals. The processor is further configured to generate a sum of the plurality of modulated phase offset data signals, wherein the sum has a lower peak value during a trial of the one or more trials of phase offsets as compared to the sum during another trial not using the selected set of phase offset signals.

In some embodiments, offsetting the phase of the multiple carriers by an optimized phase offset greatly reduces the magnitude of the peak created when each carrier is modulating a common signal. The optimal phase offsets are independent of the common signal being modulated and depend only on the scaling and frequency spacing of the multiple carriers.

In some embodiments, the optimal set of phase offsets are determined by a set of random trials. A procedure is repeated wherein a set of phase offsets is chosen randomly; test data is sent through the modulator using the desired modulation frequencies and randomly chosen phase offsets; and the peak magnitude of the summed signal is measured. The procedure is repeated a fixed number of times, and the set of phase offsets that produces the lowest peak magnitude is chosen as the optimal set of phase offsets. In some embodiments, the optimal set of phase offsets is determined by the method of random trials by a base station each time a command to begin transmitting at a new set of carrier frequencies is received.

FIG. 1A is a block diagram illustrating an embodiment of a wireless network using crest factor reduction with phase optimization. In the example shown, cellular device 100, cellular device 102, and cellular device 104 communicate with cellular base station 106. In various embodiments, cellular device 100, cellular device 102, and cellular device 104 communicate with cellular base station 106 using the same carrier frequency, using two different carrier frequencies, or using three different carrier frequencies. In some embodiments, cellular base station 106 communicates with a plurality of additional cellular devices not shown. In various embodiments, cellular base station 106 communicates with a total of 3 cellular devices, 15 cellular devices, 100 cellular devices, or any other appropriate number of cellular devices. In various embodiments, cellular base station 106 communicates with cellular devices using a single carrier frequency, 4 different carrier frequencies, 25 different carrier frequencies, or any other appropriate number of different carrier frequencies. In various embodiments, cellular base station 106 communicates with cellular devices using the multiple carrier global system for mobile communications standard (GSM), using orthogonal frequency division multiplexing (OFDM), or using any other appropriate encoding scheme using multiple carriers.

In the example shown, cellular base station also communicates with cellular network 108. Cellular network 108 comprises connections between base stations, switching subsystems, and any other appropriate network connection systems. Cellular network 108 communicates with external voice/data network 110, allowing cellular device 100, cellular device 102, and cellular device 104 to communicate with external voice/data network 110.

External voice/data network 110 comprises a voice telephony network for connecting various voice telephony devices. In various embodiments, external voicedata network 110 comprises a public switched telephone network, a private voice telephony network, or any other appropriate voice telephony network. By enabling cellular device 100 to connect to voice/data network 110, a user of cellular device 100 is able to have a verbal conversation with another user of a device that is directly or indirectly connected to voice/data network 110 (e.g., a cell phone user, a wired telephone user, a internet telephone user—for example, a voice over internet protocol user). For example, a user can use cellular device 100 to make a telephone call to someone.

In various embodiments, cellular network 108 is or is not connected to one or more data networks (e.g., external voice/data network 110). A cellular device is able to access data networks (e.g., internet, email, photo sharing, etc.) using its connection with cellular network 108. In some embodiments, a cellular device comprises a data device. In some embodiments, the data device is connected to an external data network and not an external voice network.

Figure 1B:
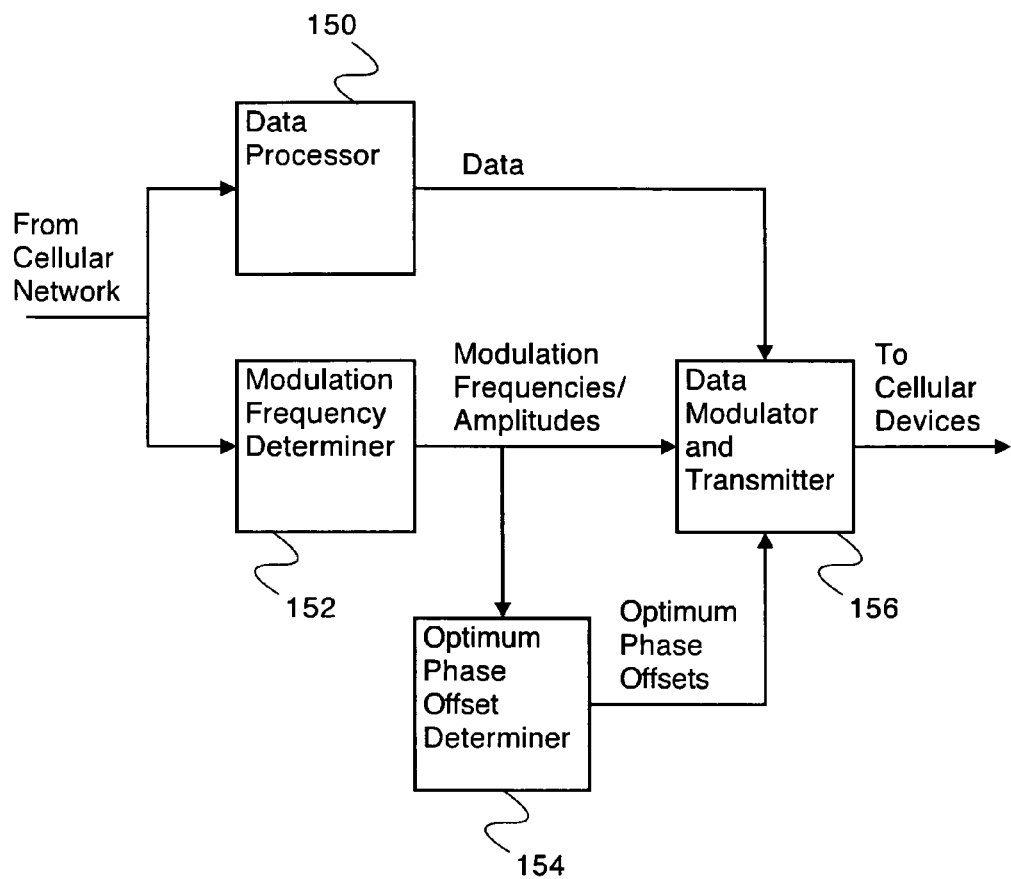
FIG. 1B is a block diagram illustrating an embodiment of a cellular base station using crest factor reduction with phase optimization.

FIG. 1B is a block diagram illustrating an embodiment of a cellular base station using crest factor reduction with phase optimization. In some embodiments, the cellular base station of FIG. 1B is cellular base station 106 of FIG. 1A. In the example shown, the cellular base station of FIG. 1B comprises data processor 150, modulation frequency determiner 152, optimum phase offset determiner 154, and data modulator and transmitter 156. Data processor 150 receives data from the cellular network (e.g., cellular network 108 of FIG. 1A), prepares the data for transmission, and sends the data to data modulator and transmitter 156. In some embodiments, preparing data for transmission includes determining which of one or more transmission channels a given piece of data should be transmitted on. Modulation frequency determiner 152 receives commands from the cellular network and determines the frequency that each of the one or more transmission channels should be modulated at. In various embodiments, the modulation frequencies are determined solely based on data received from the cellular network, are determined solely based on the internal state of modulation frequency determiner 152, or are based on any appropriate combination of received data and internal state. Modulation frequency determiner sends the determined modulation frequencies to data modulator and transmitter 156 and to optimum phase offset determiner 154. In some embodiments, modulation frequency determiner 152 also determines a scaling amplitude associated with each modulation frequency and sends the set of scaling amplitudes to optimum phase offset determiner 154 and data modulator and transmitter 154. Optimum phase offset determiner 154 determines the optimum set of phase offsets for data modulator and transmitter 156 to use based on the modulation frequencies received from modulation frequency determiner 152. In some embodiments, optimum phase offset determiner 154 determines the set of optimum phase offsets by finding the set of phase offsets that produces the minimum possible peak value for a set of test signals modulated at the received modulation frequencies and offset by the set of phase offsets. In some embodiments, the set of test signals is a constant signal (e.g., a signal that maintains a constant value, a steady sinusoidal signal, a signal that maintains a repeating pattern, etc.) for each channel. In some embodiments, the set of optimum phase offsets is found by performing a set of tests using a randomly determined set of phase offsets for each test and determining the set of phase offsets that produces the minimum peak value for the set of tests. Data modulator and transmitter 156 modulates the data received from data processor 150 at the frequencies received from modulation frequency determiner 152 offset by the phase offsets received by optimum phase offset determiner 154, performs any necessary further processing, and sends the data to the transmitting antenna.

In some embodiments, one or more processors performs the data signal processing for optimum phase offset determiner 154 (e.g., determined a set of selected phase offsets) and data modulator and transmitter 156 (e.g., modulating input data signals using a set of phase offsets, scaling the signals, and summing the signals).

Figure 2:
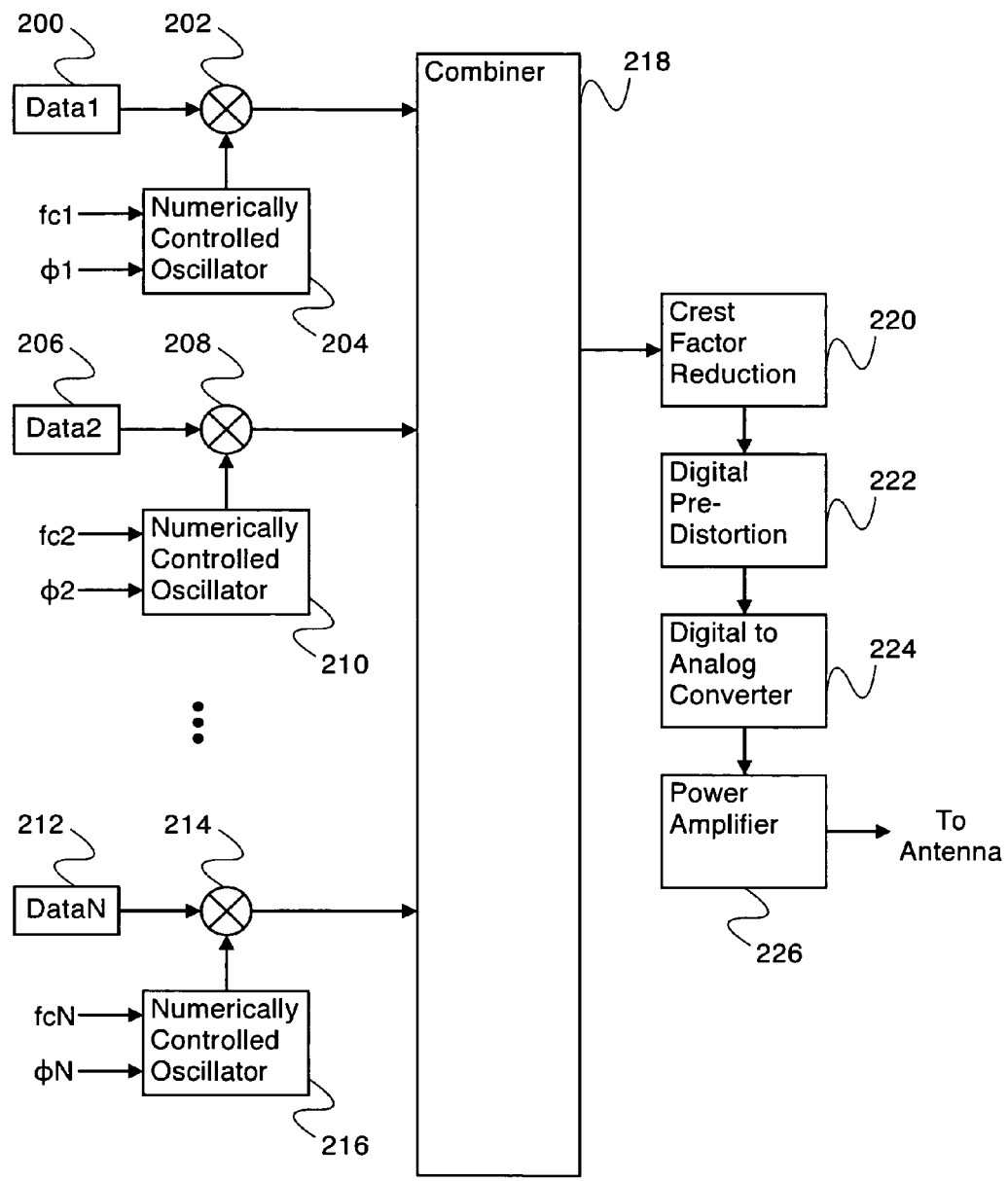
FIG. 2 is a block diagram illustrating an embodiment of a data modulator and transmitter.

FIG. 2 is a block diagram illustrating an embodiment of a data modulator and transmitter. In some embodiments, the data modulator and transmitter implements data modulator and transmitter 156 of FIG. 1B. In some embodiments, the data modulator and transmitter is part of a cellular base station using crest factor reduction with phase optimization. In the example shown, Data1 200 comprises a first data stream to be modulated at a first carrier frequency fc1. The phase of the carrier is offset by optimal phase offset $\phi 1$. Numerically controlled oscillator 204 comprises a digital oscillator capable of oscillating at a desired frequency with a desired phase offset. Numerically controlled oscillator 204 oscillates at frequency fc1 and with phase $\phi 1$. Multiplier 202 multiplies Data1 200 by the oscillation from numerically controlled oscillator 204, modulating the first data stream at the first carrier frequency. In some embodiments, the modulated first data stream is then scaled by a first amplitude.

Data2 206 comprises a second data stream to be modulated by a second carrier frequency fc2. Numerically controlled oscillator 210 and multiplier 208 comprise a copy of numerically controlled oscillator 204 and multiplier 202 for multiplying Data2 206 by an oscillation at carrier frequency fc2 and with optimal phase offset $\phi 2$. DataN 212 comprises an nth data stream to be modulated by an nth carrier frequency fcN. Numerically controlled oscillator 216 and multiplier 214 comprise a copy of numerically controlled oscillator 204 and multiplier 202 for multiplying DataN 212 by an oscillation at carrier frequency fcN and with optimal phase offset $\phi N$. In some embodiments, there are as many data streams, numerically controlled oscillators, and multipliers as there are desired carrier frequencies. In some embodiments, each modulated data stream is scaled by a scaling amplitude after modulation. In various embodiments, there are 6 different carrier frequencies, 11 different carrier frequencies, 34 different carrier frequencies, or any other appropriate number of carrier frequencies. In some embodiments, data streams are modulated by a number of sets of hardware not equivalent to the number of channels to be hardware efficient. Alignment of data streams is performed by combiner 218 so that the data streams are appropriately added as if the data channels were each processed using their own parallel sets of modulators.

Combiner 218 comprises a digital adder for adding the signals of each of the different modulated data streams. In some embodiments, the output of combiner 218 has a smaller peak value compared with the output that would be achieved without phase optimization. The output of combiner 218 is sent to crest factor reduction 220. Crest factor reduction 200 comprises a digital circuit for reducing the magnitude of the peaks in the signal while changing the frequency spectrum of the signal as little as possible. The signal is then sent to digital pre-distortion 222. Digital pre-distortion 222 implements a nonlinear transfer function that is targeted to be the inverse of the nonlinear transfer function of power amplifier 226, to achieve a system that is linear as a whole and capable of driving power amplifier 226 to its full power capacity. The signal is then sent to digital to analog converter 224, which converts the signal to analog, and then to power amplifier 226, which drives the signal into the base station antenna at high power.

Figure 3:
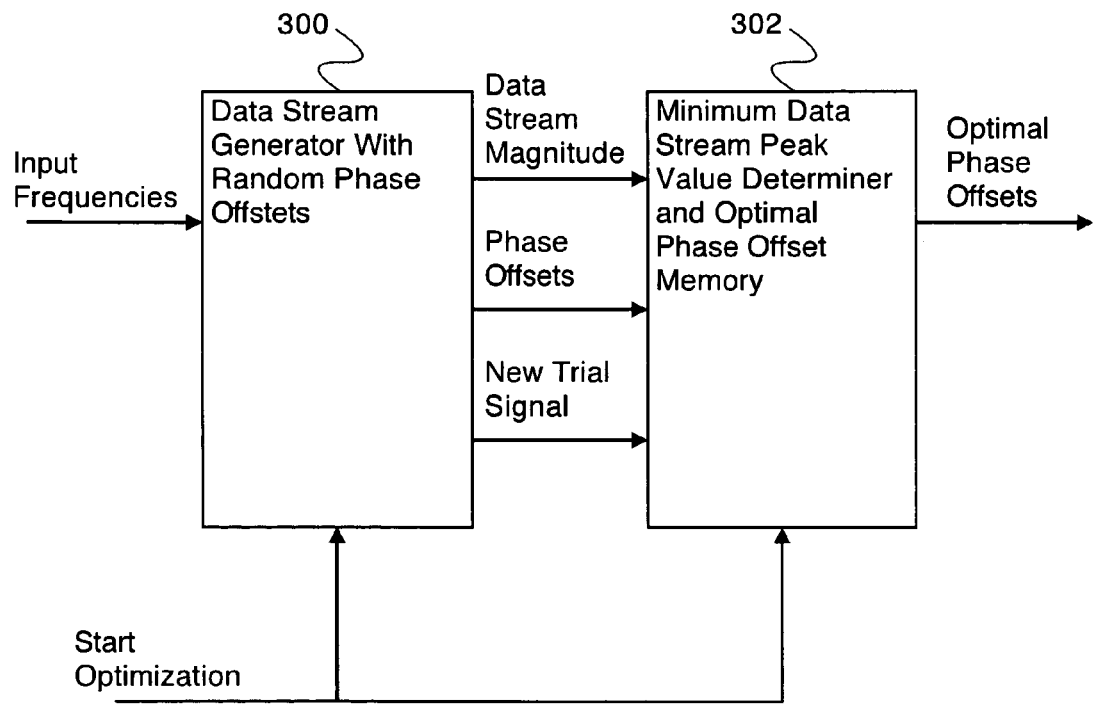
FIG. 3 is a block diagram illustrating an embodiment of an optimal phase offset determiner.

FIG. 3 is a block diagram illustrating an embodiment of an optimal phase offset determiner. In some embodiments, the optimal phase offset determiner of FIG. 3 implements optimal phase offset determiner 154 of FIG. 1B. In the example shown, the system for determining an optimal set of phase offsets comprises data stream generator with random phase offsets 300 and minimum data stream peak value determiner and optimal phase offset memory 302. Data stream generator with random phase offsets 300 comprises hardware for generating a random set of phase offsets associated with data channels modulated at different frequencies and for generating a test data stream. The frequencies for modulating the channels are received by data stream generator with random phase offsets 300 prior to operation. The test data stream representing the sum of a set of channels each modulating a predetermined test data stream with the modulating oscillators each offset by the appropriate randomly determined phase offset. Minimum data stream peak value determiner and optimal phase offset memory 302 comprises hardware for determining the peak value of the data stream generated by data stream generator with random phase offsets 300, determining the minimum value of the data stream peak across multiple sets of randomly determined phase offsets, and for storing the optimal set of phase offsets associated with the data stream with the minimum peak.

In various embodiments, the phase offsets are predetermined, pseudo-randomly determined, or determined by any other appropriate method. In various embodiments, the test signal used to determine a peak summed signal comprises: a sinusoid, a square wave, a constant signal, a random signal, a structured signal, or any other appropriate test signal.

In some embodiments, the processor for the sum determination for the modulated input data streams comprises a reduced set of hardware or processing that processes the test signals serially and combines the signals appropriately to save space on a hardware implemented optimal phase offset determiner.

Figure 4A:
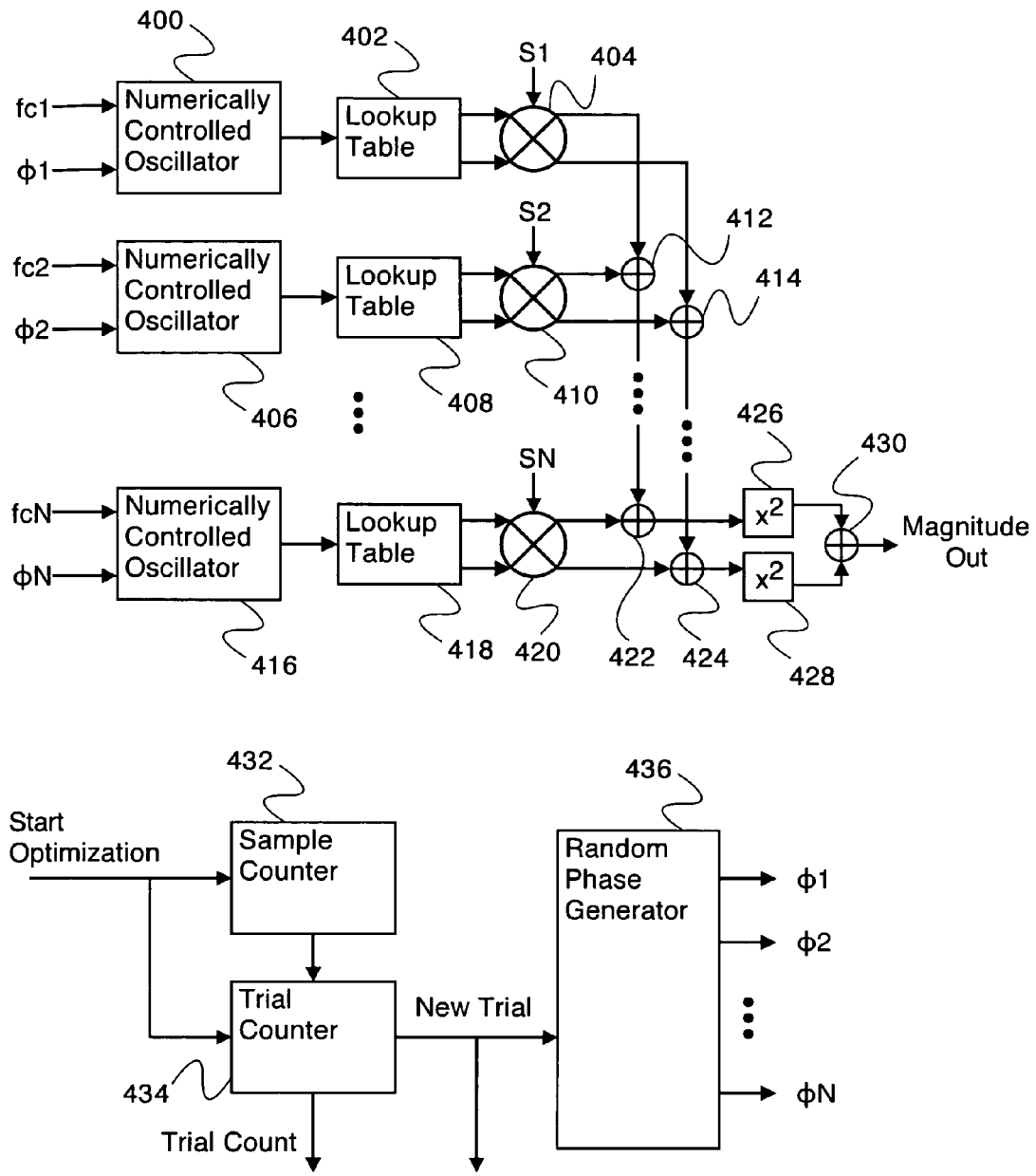
FIG. 4A is a block diagram illustrating an embodiment of a parallel data stream generator with random phase offsets.

FIG. 4A is a block diagram illustrating an embodiment of a parallel data stream generator with random phase offsets. In some embodiments, the parallel data stream generator with random phase offsets of FIG. 4A implements data stream generator with random phase offsets 300 of FIG. 3, computing the modulation channels in parallel. In the example shown, numerically controlled oscillator 400 receives a first modulation frequency fc1 and a first phase offset $\phi 1$ and produces an oscillation according to those parameters. The oscillation from numerically controlled oscillator 400 is sent to lookup table 402. Lookup table 402 creates the real and imaginary parts of a complex-valued test signal at the frequency driven by numerically controlled oscillator 400. In some embodiments, lookup table 402 generates the sine and cosine of the input value. In some embodiments, the amplitude of the signal generated by lookup table 402 is scaled by multiplier 404 by a first amplitude S1. In some embodiments, the scaling amplitude is received from the modulation frequency determiner (e.g., modulation frequency determiner 152 of FIG. 1B) along with the first modulation frequency. Numerically controlled oscillator 406, lookup table 408, and multiplier 410 comprise a copy of numerically controlled oscillator 400, lookup table 402 and multiplier 404 for creating a second modulated test signal using a second modulation frequency fc2, a second phase offset $\phi 2$, and a second scaling amplitude S2. Numerically controlled oscillator 416, lookup table 418, and multiplier 420 comprise a copy of numerically controlled oscillator 400, lookup table 402 and multiplier 404 for creating an nth modulated test signal using an nth modulation frequency fcN, an nth phase offset $\phi N$, and an nth scaling amplitude SN. In some embodiments, there are as many copies of the test signal generating hardware as there are transmission channels in the data modulator and transmitter (e.g., the data modulator and transmitter of FIG. 2). In various embodiments, optimal phase offsets corresponding to all N modulation channels are determined, optimal phase offsets corresponding to N−2 modulation channels are determined, optimal phase offsets corresponding to N/2 are determined, or optimal phase offsets corresponding to any other appropriate subset of the modulation channels are determined.

In the example shown, adder 412 adds the real part of the signal output from multiplier 404 and the real part of the signal output from multiplier 410. The real part of the signals generated by each channel of the test signal generating hardware are summed, concluding with adder 422 adding the real part of the signal output from multiplier 420 and the previous aggregate sum. Adder 414 adds the complex part of the signal output from multiplier 404 and the complex part of the signal output from multiplier 410. The complex part of the signals generated by each channel of the test signal generating hardware are summed, concluding with adder 424 adding the complex part of the signal output from multiplier 420 and the previous aggregate sum. The real aggregate sum is squared by squarer 426 and the complex aggregate sum is squared by squarer 428, and then the two squared sums are summed by adder 430. The output of 430 is the square of the complex magnitude of the summed modulated test signals. In some embodiments, the squarer is replaced by a complex magnitude operation.

Sample counter 432 and trial counter 434 track progress through the process of optimal phase offset determination. Sample counter 432 counts the number of samples that have been computed in the current trial and communicates the count to trial counter 434. In various embodiments, 10, 100, 1000, or any other appropriate number of samples are computed per trial. When the sample limit is reached, the sample counter resets and the trial counter sends the new trial signal and increments its count. Trial counter 434 counts the number of trials that have occurred in the current optimal phase offset determination process and communicates the count to random phase generator 436. In various embodiments, 10, 100, 1000, or any other appropriate number of trials are performed per optimal phase offset determination process. When the start optimization signal is received, sample counter 432 and trial counter 434 each reset their counts. When random phase generator 436 receives a command for a new trial, the random phase generator randomly generates a set of new phase offsets φ1, φ2, . . . φN for the trial. In some embodiments, random phase generator 436 generates random phases using a linear feedback shift register. The phase offsets are sent to the numerically controlled oscillators and to the minimum data stream peak value determiner and optimal phase offset memory (e.g., minimum data stream peak value determiner and optimal phase offset memory 302 of FIG. 3).

Figure 4B:
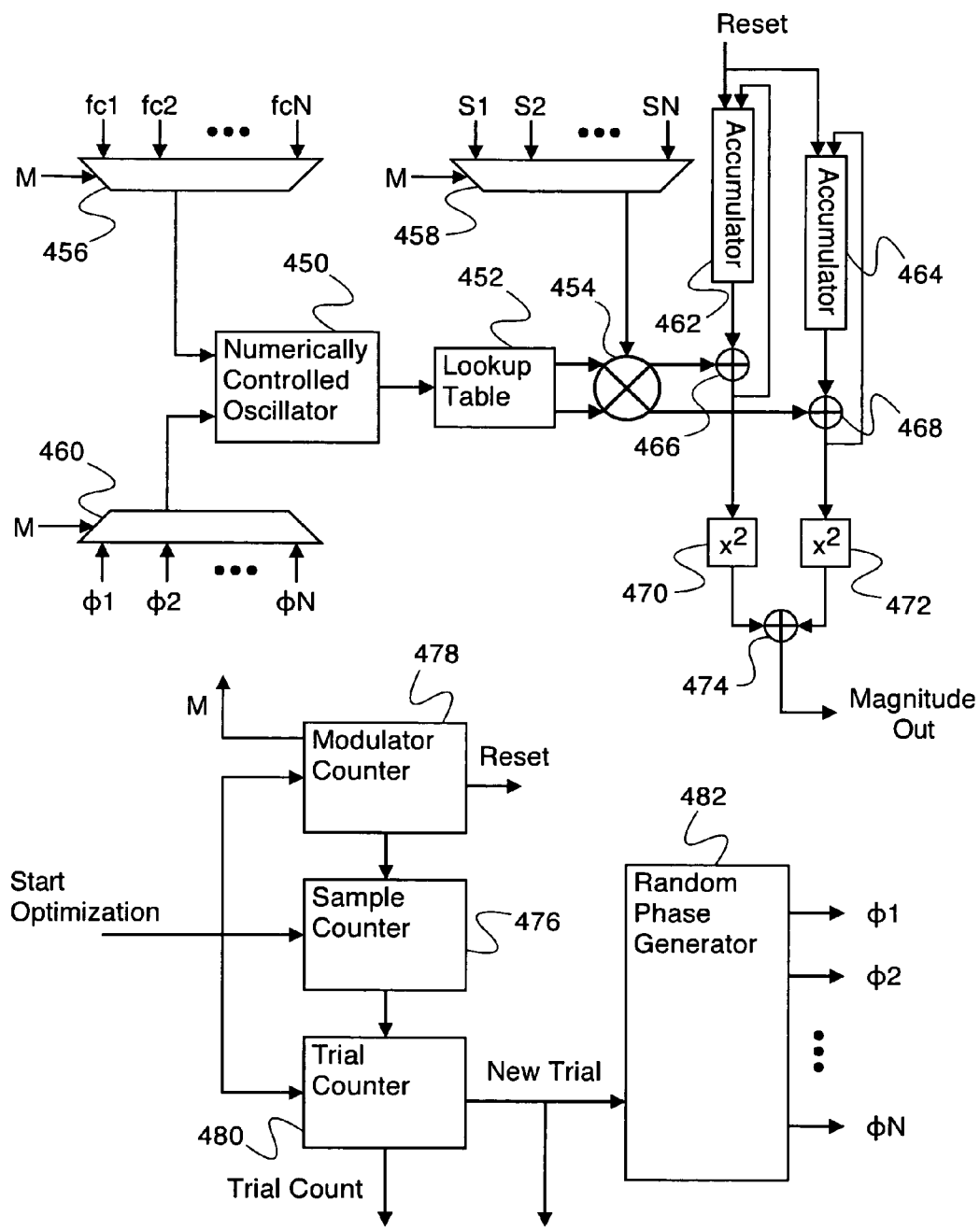
FIG. 4B is a block diagram illustrating an embodiment of a serial data stream generator with random phase offsets.

FIG. 4B is a block diagram illustrating an embodiment of a serial data stream generator with random phase offsets. In some embodiments, the serial data stream generator with random phase offsets of FIG. 4B implements data stream generator with random phase offsets 300 of FIG. 3, computing the modulation channels in serial. In the example shown, numerically controlled oscillator 450 receives a first modulation frequency fc1 and a first phase offset φ1 and produces an oscillation according to those parameters. The oscillation from numerically controlled oscillator 450 is sent to lookup table 452. Lookup table 452 creates the real and imaginary parts of a complex-valued test signal at the frequency driven by numerically controlled oscillator 450. In some embodiments, lookup table 452 generates the sine and cosine of the input value. In some embodiments, the amplitude of the signal generated by lookup table 452 is scaled by multiplier 454 by a first amplitude S1. In some embodiments, the scaling amplitude is received from the modulation frequency determiner (e.g., modulation frequency determiner 152 of FIG. 1B) along with the first modulation frequency. Multiplexer 456 stores the modulation frequency values received from the modulation frequency determiner and sends the modulation frequency value corresponding to the appropriate modulator number to numerically controlled oscillator 450. The appropriate modulator number is indicated to multiplexer 456 by the value M of modulator counter 478. Multiplexer 458 stores the scaling amplitude values received from the modulation frequency determiner and sends the scaling amplitude value corresponding to the appropriate modulator number to multiplier 454. The appropriate modulator number is indicated to multiplexer 458 by the value M of modulator counter 478. Multiplexer 460 stores the phase offset values generated by random phase generator 482 and sends the phase offset value corresponding to the appropriate modulator number to numerically controlled oscillator 450. The appropriate modulator number is indicated to multiplexer 460 by the value M of modulator counter 478. In various embodiments, optimal phase offsets corresponding to all N modulation channels are determined, optimal phase offsets corresponding to N−2 modulation channels are determined, optimal phase offsets corresponding to N/2 are determined, or optimal phase offsets corresponding to any other appropriate subset of the modulation channels are determined.

In the example shown, accumulator 462 maintains the aggregate value of the real part of the signal output from multiplier 454. Each time a new modulator is indicated, a new value is output from multiplier 454, and the real part of the output is summed with the value stored in accumulator 462 in summer 466. The sum is then stored in accumulator 462. Accumulator 464 maintains the aggregate value of the complex part of the signal output from multiplier 454. Each time a new modulator is indicated, a new value is output from multiplier 454, and the complex part is summed with the value stored in accumulator 464 in summer 468. The sum is then stored in accumulator 464. The real aggregate sum is squared by squarer 470 and the complex aggregate sum is squared by squarer 472, and then the two squared sums are summed by adder 474. The output of 474 is the square of the complex magnitude of the summed modulated test signals. In some embodiments, the squarer is replaced by a complex magnitude operation.

Modulator counter 478, sample counter 476 and trial counter 480 track progress through the process of optimal phase offset determination. Modulator counter 478 counts the modulators that have been computed for each sample, and communicates the current modulator value to multiplexer 456, multiplexer 458, multiplexer 460, and sample counter 476. In various embodiments, the system comprises 8, 31, 111, or any other appropriate number of modulators. When the modulator limit is reached, the modulator counter resets, the modulator counter indicates to accumulator 462 and accumulator 464 to reset their values, and the modulator counter indicates to sample counter 476 to increment its value. Sample counter 476 counts the number of samples that have been computed in the current trial and communicates the count to trial counter 480. In various embodiments, 10, 100, 1000, or any other appropriate number of samples are computed per trial. When the sample limit is reached, the sample counter resets and the trial counter sends the new trial signal and increments its count. Trial counter 480 counts the number of trials that have occurred in the current optimal phase offset determination process and communicates the count to random phase generator 482. In various embodiments, 10, 100, 1000, or any other appropriate number of trials are performed per optimal phase offset determination process. When the start optimization signal is received, modulator counter 478, sample counter 476 and trial counter 480 each reset their counts. When random phase generator 480 receives a command for a new trial, the random phase generator randomly generates a set of new phase offsets φ1, φ2, . . . φN for the trial. In some embodiments, random phase generator 480 generates random phases using a linear feedback shift register. The phase offsets are sent to the numerically controlled oscillators and to the minimum data stream peak value determiner and optimal phase offset memory (e.g., minimum data stream peak value determiner and optimal phase offset memory 302 of FIG. 3).

In some embodiments, a combination of parallel and serial data stream generators are used (e.g., a combination of hardware as shown in FIG. 4A and FIG. 4B).

Figure 5:
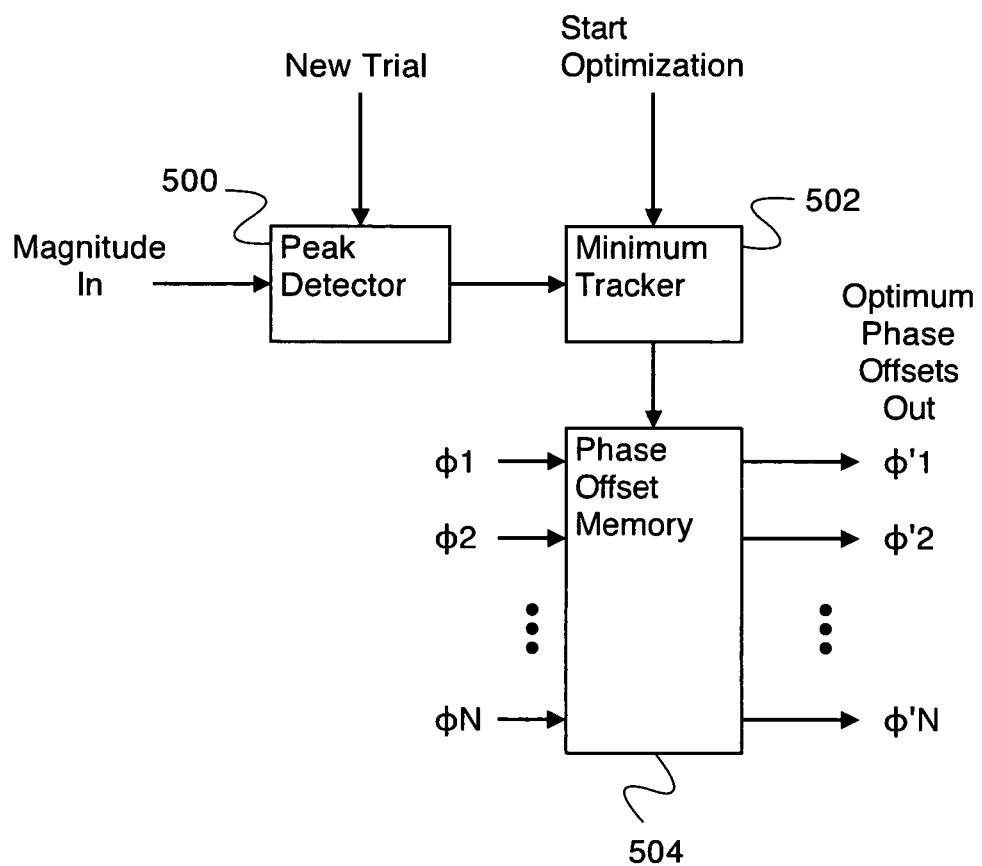
FIG. 5 is a block diagram illustrating an embodiment of a minimum data stream peak value determiner and optimal phase offset memory.

FIG. 5 is a block diagram illustrating an embodiment of a minimum data stream peak value determiner and optimal phase offset memory. In some embodiments, the minimum data stream peak value determiner and optimal phase offset memory of FIG. 5 implements minimum data stream peak value determiner and optimal phase offset memory 302 of FIG. 3. In the example shown, the minimum data stream peak value determiner and optimal phase offset memory comprises peak detector 500, minimum tracker 502, and phase offset memory 504. Peak detector 500 finds the peak value of the stream of magnitude data received from the data stream generator with random phase offsets (e.g., data stream generator with random phase offsets 300 of FIG. 3). When peak detector 500 receives the new trial signal from the data stream generator with random phase offsets, peak detector 500 outputs the stored peak value to minimum tracker 502 and resets the stored peak value. Minimum tracker 502 tracks the minimum peak value received from peak detector 500. If a received peak value is less than the minimum peak value stored in minimum tracker 502, minimum tracker 502 stores the received peak value and indicates to phase offset memory 504 that a new minimum peak value has been found. When minimum tracker 502 receives the start optimization signal, the peak value stored in minimum tracker 502 is cleared. Each time a new trial starts, phase offset memory 504 receives the current set of phase offsets generated by the random phase generator (e.g., random phase generator 436 of FIG. 4A or random phase generator 482 of FIG. 4B). When phase offset memory 504 receives a new minimum peak value found signal from minimum tracker 502, phase offset memory 504 stores the most recently received set of phase offset values $\phi 1$, $\phi 2, \ldots \phi N$ and outputs the set of phase offset values as optimum phase offset values $\phi'1, \phi'2, \ldots \phi'N$.

Figure 6:
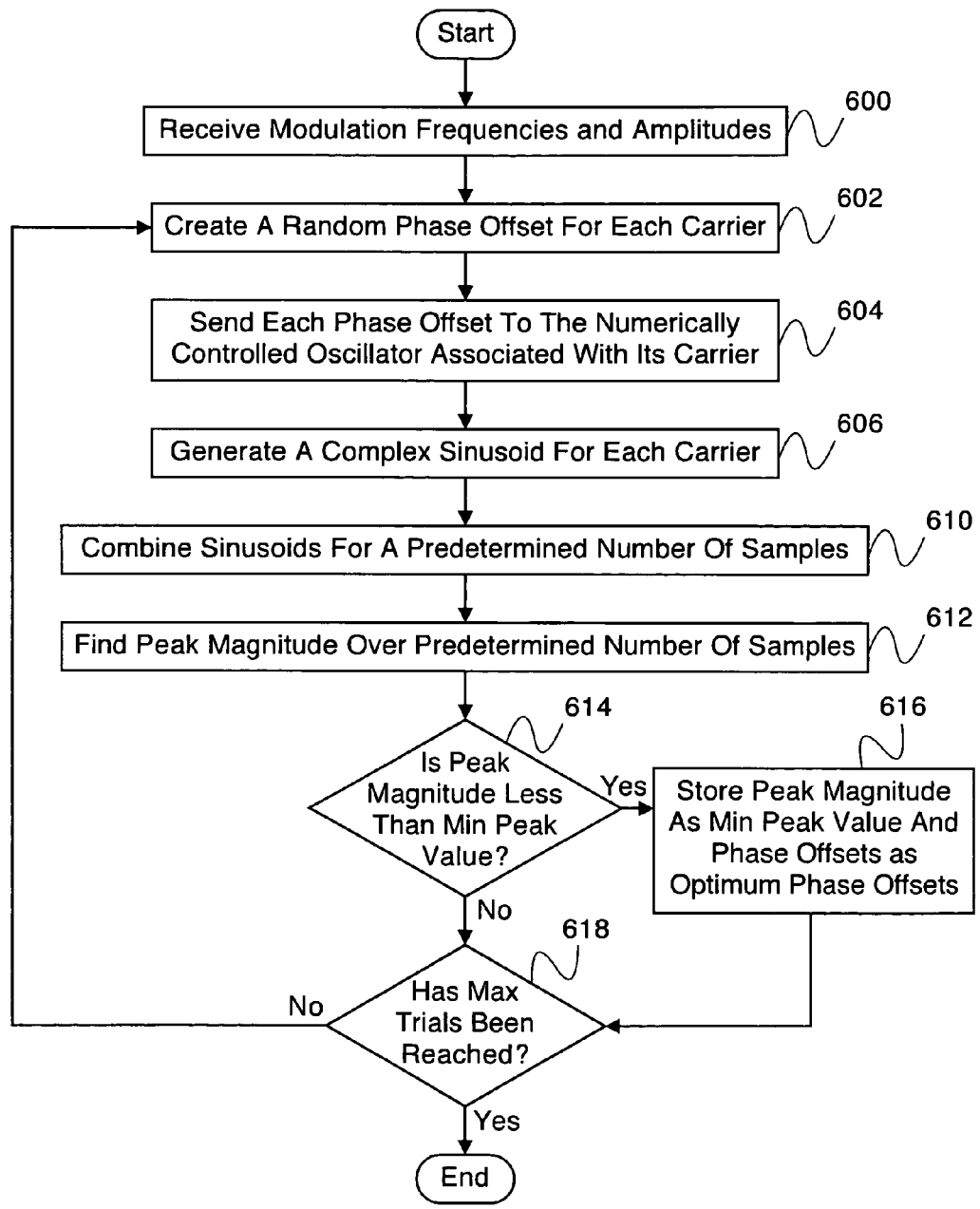
FIG. 6 is a flow diagram illustrating an embodiment of a process for determining a set of optimum phase offset values.

FIG. 6 is a flow diagram illustrating an embodiment of a process for determining a set of optimum phase offset values. In some embodiments, the process of FIG. 6 is executed by optimum phase offset determiner 154 of FIG. 1B for determining a set of optimum phase offset values. In the example shown, in 600, carrier frequencies and amplitudes are received. In 602, a random phase offset for each carrier is created. In some embodiments, a random phase offset is created for each of a subset of the total number of carriers. In some embodiments, prior to creating random phase offsets, the random generator is initialized with a new seed. In 604, each random phase offset is sent to the numerically controlled oscillator associated with its carrier. In 606, a complex sinusoid is generated for each carrier. In some embodiments, the complex sinusoids are generated with lookup tables. In 610, the complex sinusoids are combined for a predetermined number of samples. In various embodiments, the complex sinusoids are combined for 10 samples, 100 samples, 1000 samples, or any other appropriate number of samples. In 612, the peak magnitude of the combined complex sinusoids is found over the predetermined number of samples. In some embodiments, the square of the peak magnitude of the combined complex sinusoids is found. In 614, the peak magnitude is compared with the stored minimum peak value. If the peak magnitude is found to be less than the stored minimum peak value, control passes to 616. In 616, the peak magnitude is stored as the new minimum peak value and the phase offsets are stored as the new optimum phase offsets, and control passes to 618. If the peak magnitude is not determined to be less than the stored minimum peak value in 618, control passes directly to 618. In 618, the trial count is checked to see if the max trials value has been reached. In some embodiments, the max trials value is determined before beginning the process for determining a set of optimum phase offset values. In some embodiments, the max trials value is determined algorithmically based on the calculated peak values. In some embodiments, the max trials value is adjusted to allow the process to complete when a peak summed signal below a predetermined value has been found. In various embodiments, the max trials value is 10 trials, 100 trials, 1000 trials, or any other appropriate number of trials. If the trial count is not determined to have reached the max trials value, control passes to 602, where a new random set of phases is created and the process is repeated. If the trial count is determined to have reached the max trials value, the process ends.

In some embodiments, the process ends based on a minimum peak offset reaching a predetermined threshold.

Figure 7:
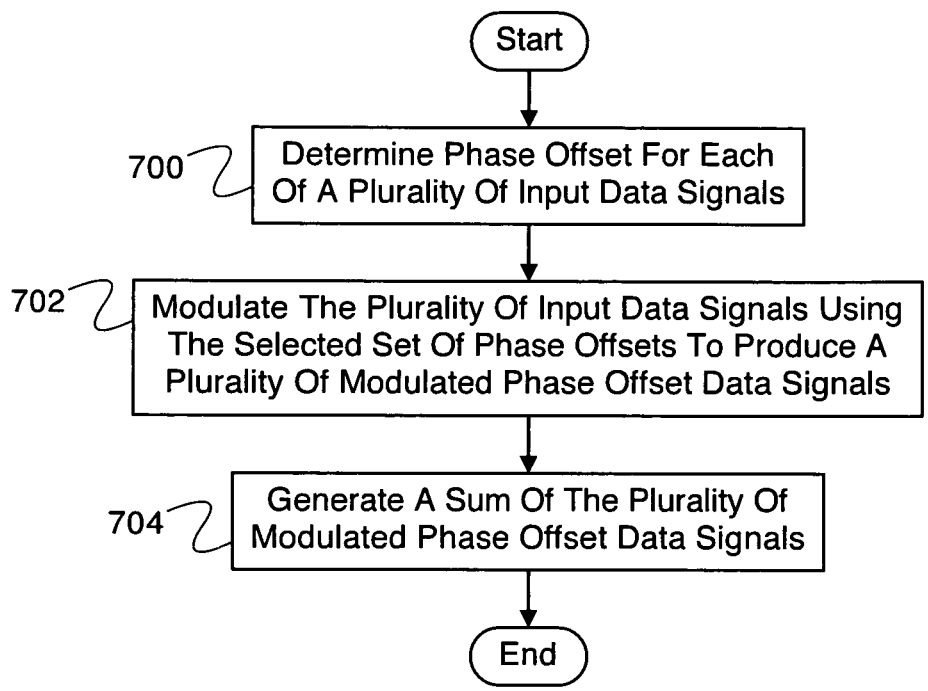
FIG. 7 is a flow diagram illustrating an embodiment of a process for preparing a set of data signals for transmission using crest factor reduction with phase optimization.

FIG. 7 is a flow diagram illustrating an embodiment of a process for preparing a set of data signals for transmission using crest factor reduction with phase optimization. In some embodiments, the process of FIG. 7 is used by a cellular base station (e.g., cellular base station 106 of FIG. 1) utilizing crest factor reduction with phase optimization. In the example shown, in 700, a phase offset is determined for each of a plurality of input data signals. The phase offset for each of the plurality of input signals is determined using one or more trials of phase offsets to determine a selected set of phase offsets. In some embodiments, phase offsets are determined using the process of FIG. 6 In 702, the plurality of input data signals is modulated using the selected set of phase offsets to produce a plurality of modulated phase offset data signals. In 704, a sum of the plurality of modulated phase offset data signals is generated. The sum has a lower peak value during a trial of the one or more trials of phase offsets as compared to the sum during another trial not using the selected set of phase offset signals, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for reducing peaks, comprising:
a processor configured to perform a plurality of trials to:
determine a plurality of phase offsets for a plurality of input data signals to determine a selected set of phase offsets;
modulate the plurality of input data signals using a corresponding phase offset from the selected set of phase offsets to produce a plurality of modulated phase offset data signals;
generate a sum of the plurality of modulated phase offset data signals,
adjust the plurality of phase offsets for each trial of the plurality of trials; and
select the plurality of phase offsets that produces a lowest sum.

2. The system of claim 1, wherein the phase offset for each of the plurality of input data signals is chosen randomly for each trial of the plurality of trials.

3. The system of claim 1, wherein a predetermined number of trials is used to determine the selected set of phase offsets.

4. The system of claim 1, wherein an algorithmically determined number of trials is used to determine the selected set of phase offsets.

5. The system of claim 1, wherein the selected set of phase offsets is chosen by finding a set of phase offsets that produces a lowest peak summed signal in response to a test input signal.

6. The system of claim 1, wherein the selected set of phase offsets is chosen by finding a set of phase offsets that produces a peak summed signal below a predetermined value.

7. The system of claim 1, wherein a frequency change signal is received in advance of a change in modulation frequencies.

8. The system of claim 7, wherein the selected set of phase offsets is determined in the event that the frequency change signal is received.

9. The system of claim 1, wherein a scaling change signal is received in advance of a change in modulation frequencies.

10. The system of claim 1, wherein the processor is further configured to scale the plurality of modulated phase offset data signals prior to generating the sum.

11. A method for reducing peaks, comprising:
performing a plurality of trials to determine a plurality of phase offsets for a plurality of input data signals to determine a selected set of phase offsets;
modulating the plurality of input data signals using a corresponding phase offset from the selected set of phase offsets to produce a plurality of modulated phase offset data signals;

generating a sum of the plurality of modulated phase offset data signals, adjusting the plurality of phase offsets for each trial of the plurality of trials; and selecting the plurality of phase offsets that produces a lowest sum.

12. The method of claim 11, wherein the phase offset for each of the plurality of input data signals is chosen randomly for each trial of the one or more trials.

13. The method of claim 11, wherein a predetermined number of trials is used to determine the selected set of phase offsets.

14. The method of claim 11, wherein an algorithmically determined number of trials is used to determine the selected set of phase offsets.

15. The method of claim 11, wherein the selected set of phase offsets is chosen by finding a set of phase offsets that produces a lowest peak summed signal in response to a test input signal.

16. The method of claim 11, wherein the selected set of phase offsets is chosen by finding a set of phase offsets that produces a peak summed signal below a predetermined value.

17. The method of claim 11, wherein a frequency change signal is received in advance of a change in modulation frequencies.

18. The method of claim 17, wherein the selected set of phase offsets is determined in the event that the frequency change signal is received.

19. The method of claim 11, wherein a scaling change signal is received in advance of a change in modulation frequencies.

20. The method of claim 11, further comprising scaling the plurality of modulated phase offset data signals prior to generating the sum.

* * * * *